US009715125B2

(12) United States Patent
Obikane

(10) Patent No.: US 9,715,125 B2
(45) Date of Patent: Jul. 25, 2017

(54) ZOOM LENS AND IMAGING APPARATUS

(71) Applicant: Tamron Co., Ltd., Saitama-shi (JP)

(72) Inventor: Yasuhiko Obikane, Saitama (JP)

(73) Assignee: Tamron Co., Ltd., Saitama-Shi (JP)

( * ) Notice: Subject to any disclaimer, the term of this patent is extended or adjusted under 35 U.S.C. 154(b) by 75 days.

(21) Appl. No.: 14/284,784

(22) Filed: May 22, 2014

(65) Prior Publication Data

US 2014/0347546 A1    Nov. 27, 2014

(30) Foreign Application Priority Data

May 24, 2013   (JP) ................................. 2013-110441

(51) Int. Cl.
*G02B 27/64* (2006.01)
*G02B 15/14* (2006.01)
*G02B 15/22* (2006.01)
*G02B 15/173* (2006.01)

(52) U.S. Cl.
CPC ........... *G02B 27/646* (2013.01); *G02B 15/14* (2013.01); *G02B 15/173* (2013.01); *G02B 15/22* (2013.01); *G02B 27/64* (2013.01)

(58) Field of Classification Search
CPC ........ G02B 15/00; G02B 15/14; G02B 15/15; G02B 15/16; G02B 15/163; G02B 15/167; G02B 15/173; G02B 15/20; G02B 15/22; G02B 15/24; G02B 15/28; G02B 27/64; G02B 27/646
See application file for complete search history.

(56) References Cited

U.S. PATENT DOCUMENTS

| 2011/0273780 A1* | 11/2011 | Hosoi ................. G02B 15/173 359/690 |
| 2011/0286105 A1 | 11/2011 | Yamanaka et al. |
| 2012/0300096 A1* | 11/2012 | Miki .................... G02B 15/173 348/222.1 |
| 2013/0148005 A1 | 6/2013 | Imaoka et al. |
| 2013/0229565 A1* | 9/2013 | Hatakeyama ........ G02B 15/173 348/345 |

(Continued)

FOREIGN PATENT DOCUMENTS

| JP | 2773131 B2 | 4/1998 |
| JP | 3958489 B2 | 5/2007 |

(Continued)

*Primary Examiner* — Thong Nguyen
(74) *Attorney, Agent, or Firm* — The Webb Law Firm

(57) ABSTRACT

A zoom lens includes a first lens group having positive refracting power, a second lens group having negative refracting power, a third lens group having positive refracting power, a fourth lens group having negative refracting power and a fifth lens group having negative refracting power in order from an object side, in which the lens groups move in magnification change from a wide angle end to a telephoto end such that a gap between the first lens group and the second lens group increases and a gap between the second lens group and the third lens group decreases, a negative lens group disposed closer to an image focusing side than a diaphragm among all lens groups is set as a focusing lens group, and the focusing lens group moves toward the image focusing side at focusing from infinity to a close object, the zoom lens satisfies a conditional expression.

5 Claims, 10 Drawing Sheets

(56) References Cited

U.S. PATENT DOCUMENTS

| | | | | |
|---|---|---|---|---|
| 2014/0347522 A1* | 11/2014 | Iwasawa | ............ | H04N 5/23296 348/240.3 |
| 2015/0085165 A1* | 3/2015 | Maruyama | ............ | G02B 15/173 348/240.3 |

FOREIGN PATENT DOCUMENTS

| | | | |
|---|---|---|---|
| JP | 2011247962 A | 12/2011 | |
| WO | 2012026088 A1 | 3/2012 | |

* cited by examiner

ZOOM LENS AND IMAGING APPARATUS

CROSS-REFERENCE TO RELATED APPLICATION

This application claims priority to Japanese Patent Application No. 2013-110441 filed May 24, 2013, the disclosure of which is hereby incorporated in its entirety by reference.

BACKGROUND OF THE INVENTION

Field of the Invention

The present invention relates to a zoom lens and an imaging apparatus, and specifically relates to a zoom lens and an imaging apparatus that are small and light weight and have a hand-shake compensation function.

Background Art

In a zoom lens for a single-lens reflex camera in the conventional technology, long flange focal length against a focal distance has been required to distribute an optical element relating to an optical viewfinder. Therefore, the long flange focal length is secured through a lens design easy to secure the back focus in which a lens group having a positive refractive power is arranged in a backward lens group disposed on the image focusing side among lens groups constituting the zoom lens. However, in recent years, depending on miniaturization of an imaging apparatus body and/or the popularization of a digital still camera employing a live view imaging on the liquid crystal display provided on the back of the imaging apparatus body, an imaging apparatus not provided the optical viewfinder has been widely used. Therefore, zoom lenses not require the long flange focal length increase, and the miniaturization of the zoom lens is demanded. In such a small zoom lens, a zoom lens suitable for video imaging including the zoom lens having a miniaturized focusing lens group and/or a vibration-compensation lens for hand-shake compensation have been proposed.

Especially in an automatic focusing at high speed in video imaging, repeated sequential motions including: vibrating (wobbling) of a part of lens groups (focusing lens group) at high speed in the optical axis direction to perform non-focusing/focusing/non-focusing state; detection of a signal of a certain frequency band of a partial image area from an output signal from an imaging sensor; determination of an optimal position of the focusing lens group in the focusing; and moving the focusing lens group to the optimal position; may be applicable. If wobbling is employed in the zoom lens design, the matter should be noted that the size of an image corresponding to the object changes in wobbling. Such magnification change in focusing depends on a change of the focal distance in the entire lens system by moving the focusing lens group in the optical axis direction in wobbling. For example, in live view imaging, if magnification change is large in wobbling, the user feels something wrong. To reduce something wrong, focusing by a lens group backward than a diaphragm is known to be effective. In addition, downsizing of the focusing lens groups is essential for wobbling with high-speed auto focusing.

Thus, not only miniaturization of a zoom lens depending on miniaturization of an imaging apparatus and the short flange focal length in recent years but also reduction in both the outer diameter of focusing lens groups and the weight as much as possible to drive the focusing lens group high speed are demanded.

Also in a vibration-compensation lens group, reduction in both outer diameter and weight is demanded to achieve not only reduction of the influence on image degradation due to hand-shaking but also reduction of the load on a vibration-compensation drive system.

Under such technical background, for example, Japanese Patent No. 3958489 discloses a wide-angle high-magnification zoom lens composed of five group lenses of a positive, negative, positive, negative and positive arranged from the object side. Further, Japanese Patent No. 2773131 discloses a compact high-magnification change zoom lens and proposes an optical system arranged a positive, negative, positive, negative and negative in Example 7. Furthermore, Japanese Patent Laid-Open No. 2011-247962 discloses a high-magnification change zoom lens and proposes an optical system arranged a positive, negative, positive, negative and negative in Example 2.

Problems to be Solved

By the way, ensurance of the telecentric characteristic in an incident light flux into the solid imaging sensor by making an exit pupil equal to or larger than a certain level in the lens system because of a limitation in an on-chip micro-lens to effectively take the incident light in the solid imaging sensor which receives the light of an optical image and converts into an electrical image signal has been required. However, depending on improvement of the aperture ratio and the advanced flexibility in the on-chip micro-lens design in a solid imaging sensor in recent years, the limitation on the exit pupil required on the lens system has decreased. Therefore, although arrangement of a lens group having positive refractive power at the back of the zoom lens to secure the telecentric characteristic has been proposed, such limitation decreases in recent years. Therefore, even if a lens group having negative refractive power is disposed at the back of the zoom lens and there is the oblique incidence of a light flux against the solid imaging sensor, the limb darkening (shading) caused by mismatch of the pupil with the on-chip micro-lens has been less remarkable. In addition, although the distortion aberration was large in some degree and remarkable conventionally, image processing may correct distortion depending on improvement of software and camera systems.

The zoom lens disclosed in Japanese Patent No. 3958489 concentrates in appropriate correction of various aberrations including the distortion aberration while achieving telecentric characteristic. Therefore, as described above, the zoom lens optical system disclosed in Japanese Patent No. 3958489 is not sufficiently miniaturized as compared with a case where five group lenses of a positive, negative, positive, negative and negative are arranged from the object side and the distortion aberration is intentionally made remain since the lens group having positive refractive power is disposed at the back of the zoom lens. Further, the total length is long since the flange focal length is designed to be used in a conventional single-lens reflex camera and the back focus against the total zoom lens length is set long also.

Although the optical system is compact in the zoom lens disclosed in Japanese Patent No. 2773131, as the invention relates to an optical system suitable for a film camera, the specification of a focusing lens group and the arrangement of a vibration-compensation optical system to support recent video imaging are not employed.

The zoom lens disclosed in Japanese Patent Laid-Open No. 2011-247962 has long focal distance in five lens groups against the effective focal length and weak in refractive power. Therefore, the miniaturization and weight reduction of the zoom lens are not sufficient, and further miniaturization and weight reduction are required.

Therefore, an object of the present invention is to provide a zoom lens small in size and which keep a change in the imaging magnification due to wobbling small, especially reduce the load on a focus drive system by weight reduction of a lens system in a focusing lens group.

SUMMARY OF THE INVENTION

As a result of diligent study of the present inventors, the object is achieved by adopting a zoom lens described below.

A zoom lens according to the present invention includes first lens group having positive refractive power, a second lens group having negative refractive power, a third lens group having positive refractive power, a fourth lens group having negative refractive power and a fifth lens group having negative refractive power in order from an object side, wherein the lens groups move in magnification change from a wide angle end to a telephoto end such that a gap between the first lens group and the second lens group increases and a gap between the second lens group and the third lens group decreases; a negative lens group disposed closer to an image focusing side than a diaphragm among all lens groups is set as a focusing lens group, and the focusing lens group moves toward the image focusing side in focusing from infinity to a close object; the zoom lens satisfies conditional expression (1); and the focus lens group is composed of a single lens block of a meniscus shape provided with a concave surface at an image focusing side; and satisfies conditional expression (2) below. As they appear in this application, the terms "image focusing side" and "image plane side" are synonymous, and may be used interchangeably.

[Expression 1]

$$1.25 \leq \beta 5T \leq 3.10 \tag{1}$$

Where

β5T: Lateral magnification in telephoto end of fifth lens group

[Expression 2]

$$3.10 \leq ra4/rb4 \leq 5.40 \tag{2}$$

Where ra4: Curvature radius of object side surface of focus lens group rb4: Curvature radius of image focusing side surface of focus lens group In the zoom lens according to the present invention, it is preferable to satisfy a conditional expression (3) below.

[Expression 3]

$$1.10 \leq f1/(fw \times ft)^{1/2} \leq 3.00 \tag{3}$$

where f1: Focal length of first lens group fw: Focal length of the zoom lens at the wide angle end ft: Focal length of the zoom lens at the telephoto end In the zoom lens according to the present invention, it is preferable to satisfy a conditional expression (4) below.

[Expression 4]

$$1.40 \leq \beta 4W \times \beta 5W \leq 2.50 \tag{4}$$

Where

β4W: Lateral magnification in wide angle end of fourth lens group

β5W: Lateral magnification in wide angle end of fifth lens group

In the zoom lens according to the present invention, the third lens group is preferable to include at least a vibration-compensation lens group composed of a single lens block, hand-shake compensation is performed by moving the vibration-compensation lens group in a direction perpendicular to an optical axis and satisfies a conditional expression (5) below.

[Expression 5]

$$-1.30 \leq ra3/rb3 \leq -0.10 \tag{5}$$

Where ra3: Curvature radius of object side surface of vibration-compensation lens group rb3: Curvature radius of image focusing side surface of vibration-compensation lens group In the zoom lens according to the present invention, the fifth lens group is preferable to include at least a single lens block of a meniscus shape provided with a concave surface at an object side; and the single lens block of the meniscus shape has a negative focal distance—or negative focal length—and satisfies conditional expression (6) below. As they appear in this application, the terms "negative focal distance" and "negative focal length" are synonymous, and may be used interchangeably.

[Expression 6]

$$0.15 \leq ra5/rb5 \leq 0.80 \tag{6}$$

Where ra5: Curvature radius of object side surface of lens of meniscus shape rb5: Curvature radius of image focusing side surface of lens of meniscus shape An imaging apparatus according to the present invention includes the zoom lens and an imaging sensor that converts an optical image formed on the image focusing side by the zoom lens into an electrical signal.

ADVANTAGES OF THE INVENTION

According to the present invention, a zoom lens small in size and makes a change of the image magnification due to wobbling small, especially reduces the load on a focus drive system by weight reduction of a lens system of a focusing lens group.

DETAILED DESCRIPTION OF THE PREFERRED EMBODIMENTS

Figure 1:
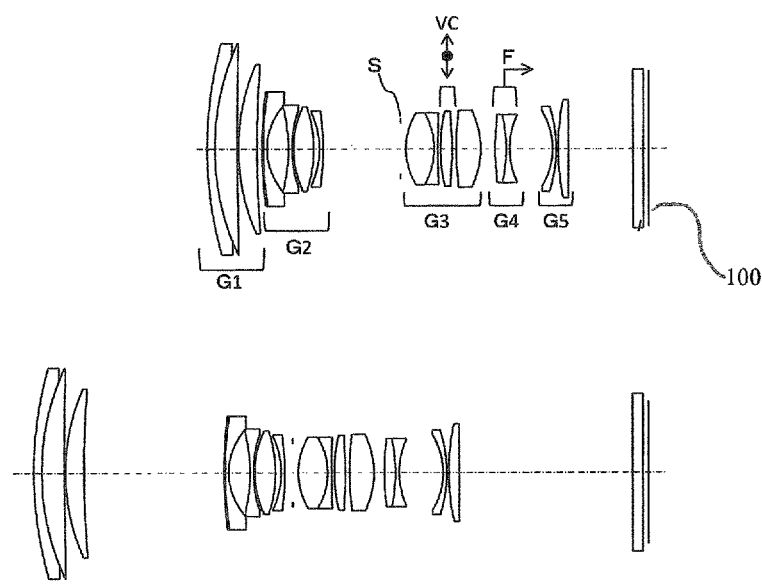
FIG. 1 is a schematic diagram exemplifying a structure of a zoom lens according to Example 1 of the present invention, where the upper diagram shows a lens arrangement at the wide angle end and the lower diagram shows a lens arrangement at the telephoto end.

Embodiments of a zoom lens and an imaging apparatus according to the present invention will be described.

1. Zoom Lens 1-1. Arrangement of Optical System

First, the arrangement and motion of an optical system of a zoom lens according to the present invention will be described. The zoom lens according to the present invention includes a first lens group having positive refractive power, a second lens group having negative refractive power, a third lens group having positive refractive power, a fourth lens group having negative refractive power and a fifth lens group having negative refractive power in order from the object side. The lens groups move in magnification change from a wide angle end to a telephoto end such that a gap between the first lens group and the second lens group increases and a gap between the second lens group and the third lens group decreases, a negative lens group disposed closer to an image focusing side than a diaphragm among all lens groups is set as a focusing lens group, and the focusing lens group moves toward the image focusing side at focusing from infinity to a close object. In addition, in the zoom lens according to the present invention, the focus lens group is composed of a single lens block of a meniscus shape having a concave surface at image focusing side.

The zoom lens according to the present invention is a zoom lens of a so-called telephoto type, the first lens group to the third lens group constituting an object side group have positive refractive power as a whole and the fourth lens group and the fifth lens group constituting an image focusing side lens group have negative refractive power as a whole. In the present invention, the total optical length at the telephoto end of the zoom lens is made shorter than the focal distance at the telephoto end of the zoom lens since the zoom lens is a telephoto type. Therefore, increase in the total optical length at the telephoto end can be hindered even if the magnification change is increased to a focal distance of 300 mm or more in terms of 35 mm film, for example.

In addition, the present invention provides the zoom lens of the telephoto type as described above and employs an arrangement in which an image focusing side lens group includes at least the fourth lens group and the fifth lens group that have negative refractive power. Therefore, the entire negative refractive power in the image focusing side lens group can be easily made stronger than that of the zoom lens of the five-group arrangement of a positive, negative, positive, negative and positive in the conventional technology. That is, the total optical length at the telephoto end can be made short against the focal distance at the telephoto end even if the magnification change is increased since it becomes easy to provide a zoom lens of a stronger telephoto tendency.

Note that one or more inner cylinders are housed in a lens barrel (cylinder) in a telescoping manner in the zoom lens. The inner cylinders are drawn to the object side in the magnification change. If a difference in the total optical length between the telephoto end and the wide angle end is large, the cylinder should house a plurality of inner cylinders to make the total length of the lens barrel short. However, if the cylinder houses the plurality of inner cylinders, the diameter of the cylinder increases depending on the thickness of the inner cylinders. Therefore, as a zoom lens of a stronger telephoto tendency as described above is employed in the present invention, increase in the total optical length at the telephoto end is hindered even if the magnification change is increased, and results hindered increase in the number of inner cylinders housed in the cylinder. Therefore, the present invention achieves miniaturization in not only the total optical length at the telephoto end but also the outer diameter of the lens barrel.

1-2 Motion

Next, focusing and zooming in the zoom lens of the arrangement will be described one by one.

(1) Focusing

First, the focusing will be described. In the zoom lens according to the present invention, a negative lens groups disposed closer to the image focusing side than a diaphragm among all lens groups is set as a focusing lens group, and focusing is performed by moving the focusing lens group toward the image focusing side in focusing from the infinity to the close object as described above. As the negative lens group disposed closer to the image focusing side than the diaphragm is set as the focusing lens group and moves toward the image focusing side, the magnification change motion caused due to wobbling is hindered in focusing.

In addition, as the negative lens group disposed closer to the image focusing side than the diaphragm is set as the focusing lens group, i.e. a rear lens group with a relatively small diameter in the zoom lens is set as the focusing lens group, high-speed auto focusing is achieved since a lens system of the focusing lens group is light weight and the load on a focus drive system is reduced. In this sense, from the viewpoint that the focusing lens group should be light weight to achieve higher-speed auto focusing, the focusing lens group is composed of a single lens block in the present invention. Note that the single lens block may be a single lens or a cemented lens composed of a plurality of lenses (the same applies hereinafter).

Note that, regarding the position of the diaphragm (aperture diaphragm), it is general to dispose it closer to the image focusing side than the second lens group, and is disposed closer to the image focusing side than the second lens group in the present invention also. However, a specific diaphragm position is not specifically limited and it can be arbitrarily disposed in an appropriate position according to a requested optical characteristics. In addition, as for the focusing lens group, any lens group is acceptable as long as it is a lens group which has negative refractive power and is disposed closer to the image focusing side than the diaphragm. For example, it is preferable to dispose the diaphragm closer to a side which is the image focusing side than the second lens group and closer to the object side than the fourth lens group, and set the fourth lens group or the fifth lens group as the focusing lens group. Selection of the focusing lens group from the negative lens groups can be suitable matter according to the specific lens arrangement in the zoom lens.

To make telephoto tendency of a zoom lens stronger, the negative refractive power of the image focusing side lens group should be strong as described above. In the conventional technology, the fourth lens group has the negative refractive power and the fifth lens group has the positive refractive power in the zoom lens of the telephoto type. Such design was employed to ensure the telecentric characteristic. However, if the fourth lens group is set as the focusing lens group, an aberration fluctuation and a magnification change motion are caused according to wobbling since the fourth lens group having strong refractive power moves along the optical axis direction in focusing. Therefore, the aberration fluctuation and the magnification change motion are hindered even if the negative lens group constituting the image focusing side lens group is set as the focusing lens group in the present invention by disposing the zoom lens provided with strong telephoto tendency by distributing negative refractive power to each of the fourth lens group and the five lens group that constitute the image focusing side lens group. For example, in an imaging apparatus without an optical viewfinder such as a mirror-less single lens reflex camera, the user performs imaging while confirming a live view image on a liquid crystal display installed in the back of the device body. Note that, if the zoom lens according to the present invention is used, display of an image in high performance as a live view image with less magnification change in focusing is made possible. Therefore, the zoom lens according to the present invention can be suitably used for the imaging apparatus such as the mirror-less single lens reflex camera.

(2) Zooming (Magnification Change)

Next, zooming will be described. In the zoom lens according to the present invention, as long as the lens groups move to make the gap between the first lens group and the second lens group increase and the gap between the second lens group and the third lens group decrease in the magnification change from the wide angle end to the telephoto end as described above, the specific motion of each lens group is not especially limited. However, from the viewpoint that the degree of freedom of aberration correction is improved and high imaging performance is acquired in the entire zoom area, it is preferable to relatively move each lens group to change the gaps between lens groups among the first to fifth lens groups in magnification change. It is because, if the gaps between the lens groups changes in magnification change, adjustment of the position of each lens group to a position preferable for aberration correction at each magnification is made easy. In the motion, the gaps between the lens groups may change by separately moving all lens groups in magnification change, or partial lens groups among all lens groups may integrally move and the remaining lens groups may separately move. Alternatively, instead of setting all lens groups as a movement group, partial lens groups may be a fixed lens group.

(3) Vibration-Compensation

In the zoom lens composed of the arrangement above, the third lens group is preferable to be hand-shake compensation lens group by providing a vibration-compensation lens group composed of a single lens block and moving the vibration-compensation lens group in the perpendicular direction against the optical axis in the present invention. As the miniaturization and weight reduction of the vibration-compensation lens group is achieved by disposing the vibration-compensation lens group in the third lens group and the vibration-compensation lens group is composed of the single lens block, load on a vibration-compensation drive system is reduced.

The zoom lens according to the present invention described above is one aspect of the zoom lens according to the present invention, and the specific lens arrangement may be arbitrarily arranged without departing from the scope of the present invention.

1-3. Conditional Expressions

Next, conditional expressions which the zoom lens according to the present invention should satisfy or is preferable to satisfy will be described. The zoom lens according to the present invention is characterized by satisfying the following conditional expression (1) and conditional expression (2), and it is preferable to satisfy conditional expression (3) to conditional expression (6) described below.

[Expression 7]

$$1.25 \leq \beta 5T \leq 3.10 \quad (1)$$

Where $\beta 5T$: Lateral magnification in telephoto end of fifth lens group

[Expression 8]

$$3.10 \leq ra4/rb4 \leq 5.40 \qquad (2)$$

Where ra4: Curvature radius of object side surface of focus lens group rb4: Curvature radius of image focusing surface side surface of focus lens group 1-3-1. Conditional Expression (1)

First, conditional expression (1) will be described. Conditional expression (1) defines the lateral magnification of the fifth lens group at the telephoto end. In conditional expression (1), if the numerical value is lower than the lower limit value, the synthetic focal distance from the first lens group to the fourth lens group is not made sufficiently short and miniaturization of the optical total length of the zoom lens is made difficult especially in the telephoto end since the negative refractive power of the fifth lens group is too weak. In contrast, if the numerical value exceeds the upper limit value, the exit pupil distance is made short and an angle of incident light into imaging sensors including CCD disposed on the image focusing surface may incline since the negative refractive power of the fifth lens group is too strong. That is, out of the range is not preferable since the light intensity is reduced by the disproportion of the pupil at the periphery.

From these viewpoints, in conditional expression (1), the numerical value in the range of (1a) below is preferable and in the range of (1b) is more preferable.

$$1.30 \leq \beta 5T \leq 2.80 \qquad (1a)$$

$$1.35 \leq \beta 5T \leq 2.50 \qquad (1b)$$

1-3-2. Conditional Expression (2)

Next, conditional expression (2) will be described. In the zoom lens according to the present invention, the above-mentioned focus group is composed of a single lens block to achieve high-speed auto focusing and miniaturization and weight reduction of the zoom lens. Further, the single lens block is preferable to be a meniscus-shaped single lens or cemented lens having concave surface at the image focusing side.

The conditional expression (2) specifies the ratio between the curvature radius at the object side surface and the curvature radius of the image focusing side surface of the focusing lens group if the focusing lens group is composed of the meniscus-shaped single lens block. In conditional expression (2), if the numerical value is smaller than the lower limit value, as the total optical length may be long since the refracting power of the focusing lens group is weak and the focus stroke from the infinity object to the nearest object increases, it is not preferable since the miniaturization of the zoom lens is hardly achieved. In contrast, the numerical value of bigger than the upper limit value is not preferable since control of a focus drive system is made difficult because of too high focusing sensitivity to the movement in the optical axis of the focusing lens group, too high focusing sensitivity caused by too strong refracting power of the focusing lens group.

From these viewpoints, regarding conditional expression (2), the numerical value in the range of (2a) below is preferable and in the range of (2b) is more preferable.

$$3.30 \leq ra4/rb4 \leq 5.20 \qquad (2a)$$

$$3.50 \leq ra4/rb4 \leq 5.00 \qquad (2b)$$

1-3-3. Conditional Expression (3)

Next, conditional expression (3) will be described. The zoom lens according to the present invention is preferable to satisfy conditional expression (3) below.

[Expression 9]

$$1.10 \leq f1/(fw \times ft)^{1/2} \leq 3.00 \qquad (3)$$

where f1: Focal length of first lens group fw: Focal length of the zoom lens at the wide angle end ft: Focal length of the zoom lens at the telephoto end Conditional expression (3) specifies the focal distance of the first lens group against the effective focal length of the entire optical system of the zoom lens. In conditional expression (3), if the numerical value is smaller than the lower limit value, performance degradation against the design performance after assembly may be made large due to an influence of relative eccentricity since the refracting power of the first lens group is strong. In contrast, if the value is larger than the upper limit value, total optical length hardly be short especially in a telephoto end since the refracting power of the first lens group is weak.

From these viewpoints, in conditional expression (3), the numerical value in the range of (3a) below is preferable and in the range of (3b) is more preferable.

$$1.10 \leq f1/(fw \times ft)^{1/2} \leq 2.60 \qquad (3a)$$

$$1.20 \leq f1/(fw \times ft)^{1/2} \leq 2.20 \qquad (3b)$$

1-3-4. Conditional Expression (4)

Next, conditional expression (4) will be described. The zoom lens according to the present invention is preferable to satisfy conditional expression (4) below.

[Expression 10]

$$1.40 \leq \beta 4W \times \beta 5W \leq 2.50 \qquad (4)$$

Where

β4W: Lateral magnification in wide angle end of fourth lens group

β5W: Lateral magnification in wide angle end of fifth lens group

The conditional expression (4) specifies the product of the lateral magnification at the wide angle end of the fourth lens group and the lateral magnification at the wide angle end of the fifth lens group. In conditional expression (4), if the numerical value is smaller than the lower limit value, the focal length from the first lens group to the third lens group are hard to be short and hardly make total optical length at the wide angle end short. In contrast, if the numerical value is bigger than the upper limit value, the lateral magnifications of the fourth lens group and fifth lens group are made large and the refracting power becomes strong, and therefore, the performance degradation against the design performance after assembly is made large due to an influence of relative eccentricity.

From these viewpoints, in conditional expression (4), the numerical value in the range of (4a) below is preferable and in the range of (4b) is more preferable.

$$1.60 \leq \beta 4W \times \beta 5W \leq 2.30 \qquad (4a)$$

$$1.80 \leq \beta 4W \times \beta 5W \leq 2.10 \qquad (4b)$$

1-3-5. Conditional Expression (5)

Next, conditional expression (5) will be described. In the zoom lens according to the present invention, if the third lens group includes the vibration-compensation lens group, it is preferable to satisfy conditional expression (5) below. Note that in this case, the vibration-compensation lens group is composed of a single lens block as described above and performs hand-shake compensation by moving in the direction perpendicular to the optical axis, and is preferable to constitute a part of the third lens group.

[Expression 11]

$$-1.30 \leq ra3/rb3 \leq -0.10 \quad (5)$$

Where ra3: Curvature radius of object side surface of vibration-compensation lens group rb3: Curvature radius of image surface side surface of vibration-compensation lens group Conditional expression (5) specifies the ratio between the curvature radius at the object side surface of the vibration-compensation lens group and the curvature radius at the image focusing side surface of the vibration-compensation lens group. In conditional expression (5), the numerical value of smaller than the lower limit value is not preferable because the eccentric coma aberration and the eccentric astigmatism increase if the vibration-compensation lens group is made eccentric since the refracting power of the vibration-compensation lens group is too strong. In contrast, if the value is bigger than the upper limit value, as the stroke of the vibration-compensation lens group increases since the refracting power of the vibration-compensation lens group is weak, the outer diameter of the lens-barrel increases and fast driving of the vibration-compensation lens group is made difficult.

From these viewpoints, in conditional expression (5), the numerical value in the range of (5a) below is preferable and in the range of (5b) is more preferable.

$$-1.20 \leq ra3/rb3 \leq -0.25 \quad (5a)$$

$$-1.10 \leq ra3/rb3 - 0.30 \quad (5b)$$

1-3-6. Conditional Expression (6)

Next, conditional expression (6) will be described. Conditional expression (6) is an expression relating to the fifth lens group. In the zoom lens according to the present invention, the fifth lens group includes at least a single lens block of a meniscus shape provided with a concave surface at an object side as described above, and the single lens block of the meniscus shape has a negative focal distance and satisfies conditional expression (6).

[Expression 12]

$$0.15 \leq ra5/rb5 \leq 0.80 \quad (6)$$

Where ra5: Curvature radius of object side surface of lens of meniscus shape rb5: Curvature radius of image surface side surface of lens of meniscus shape The conditional expression (6) specifies the ratio between the curvature radius at the object side surface and the curvature radius at the image focusing side surface if the fifth lens group includes a negative lens composed of the meniscus-shaped single lens block in which the surface at the object side is concave against the object side. In conditional expression (6), if the numerical value is equal to or smaller than the lower limit value, the lens may be a negative lens in which both surfaces are concave. Therefore, it is not preferable because the image focusing side surface should be concave against the image focusing side to make the intensity of ghost high by multipath reflection with the focusing image. In contrast, if the numerical value is bigger than the upper limit value, various aberrations such as astigmatism and the curvature of field increase since the refracting power of the negative lens is strong. That is, achievement of short total optical length is made difficult since the number of lenses constituting fifth lens group should increase for compensation.

From these viewpoints, in conditional expression (6), the numerical value in the range of (6a) below is preferable and in the range of (6b) is more preferable.

$$0.25 \leq ra5/rb5 \leq 0.70 \quad (6a)$$

$$0.35 \leq ra5/rb5 \leq 0.60 \quad (6b)$$

2. Imaging Apparatus

Next, an imaging apparatus according to the present invention will be described. The imaging apparatus according to the present invention is characterized by including the zoom lens described above and an imaging sensor that converts an optical image formed on the image focusing side by the zoom lens into an electrical signal. Note that, the imaging sensor is not specifically limited. However, the zoom lens is suitable for an imaging apparatus including a type without an optical viewfinder and a reflex mirror since the flange focal length of the zoom lens according to the present invention is short, as described above. Especially, it is preferable to apply the zoom lens according to the present invention in a small imaging apparatus mounting a small solid imaging sensor such as a so-called mirror-less single lens reflex camera since the zoom lens achieves miniaturization and high magnification change. In addition, an imaging apparatus is preferable to be able to take a moving image in the present invention since the zoom lens achieves high-speed auto focusing even in video imaging.

Next, the present invention will be specifically described with showing Examples and the Comparative Examples. However, the present invention is not limited to Examples, the lens arrangement described in the following Examples merely exemplifies the present invention, and the lens arrangement of the zoom lens according to the present invention may be arbitrarily arranged without departing from the scope of the present invention.

Next, Examples and Comparative Examples will be shown to specifically describe the present invention. However, the present invention is not limited to the Examples.

EXAMPLE 1

Examples of a zoom lens according to the present invention will be described referring to the drawing. FIG. 1 is a schematic diagram exemplifying a structure of the zoom lens in Example 1. The upper diagram shows a lens arrangement in a wide angle end and the lower diagram shows a lens arrangement in a telephoto end.

As shown in FIG. 1, the zoom lens in Example 1 includes first lens group G1 having positive refracting power, second lens group G2 having negative refracting power, third lens group G3 having positive refracting power, fourth lens group G4 having negative refracting power and fifth lens group G5 having negative refracting power in order from the object side. A diaphragm is disposed between the second lens group G2 and the third lens group G3. The fourth lens group G4 is composed of a cemented lens in which a positive lens and a negative meniscus lens having a concave surface at the image focusing side are cemented, and fourth lens group G4 functions as focusing lens group F in Example 1. In addition, third lens group G3 includes vibration-compensation lens group VC composed of a single positive lens, and the vibration-compensation lens group VC moves in a direction perpendicular to the optical axis for hand-shake compensation. Furthermore, at the object side of the fifth lens group G5, a meniscus lens having a concave surface at the object side is disposed. Note that, the specific lens arrangement of each lens group is as shown in FIG. 1.

In the zoom lens in Example 1, in magnification change from the wide angle end to the telephoto end, the lens groups move such that the gap between first lens group G1 and second lens group G2 increases and the gap between second lens group G2 and third lens group G3 decreases. In addition, in the magnification change, third lens group G3 and the fifth lens group move on the same trajectory. In addition, in focusing from the infinity to the close object, the fourth lens group G4 moves toward the image focusing side. In an embodiment, an imaging sensor 100 may be operatively connected to the imaging apparatus. The imaging sensor 100 may convert an optical image formed on an image plane side by the zoom lens into an electrical signal.

The movement in the direction perpendicular to the optical axis of vibration-compensation lens group VC in a hand-shake compensation at the telephoto end is 0.308 mm. If the imaging distance is ∞ and the zoom lens system inclines by 0.3° at the telephoto end, the image eccentricity is equal to the image eccentricity if the vibration-compensation lens group moves in parallel in the direction perpendicular to the optical axis. Note that, even for the zoom lens of each of Examples 2 to 9, the movement in the direction perpendicular to the optical axis of each vibration-compensation lens group is equal to the image eccentricity if the zoom lens system inclines by 0.3°.

Figure 2:
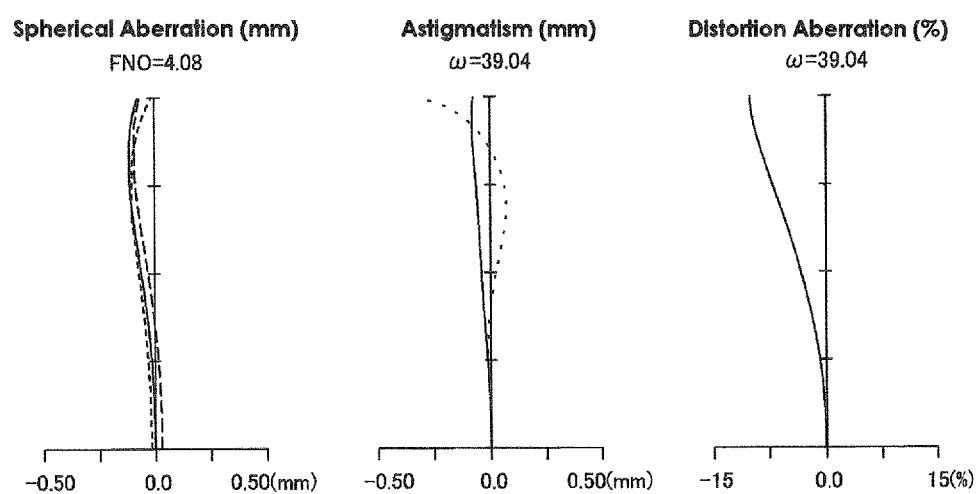
FIG. 2 is a longitudinal aberration diagram of a spherical aberration, astigmatism and distortion abbreviation in infinity focusing in a wide angle end of the zoom lens according to Example 1 of the present invention.
Figure 3:
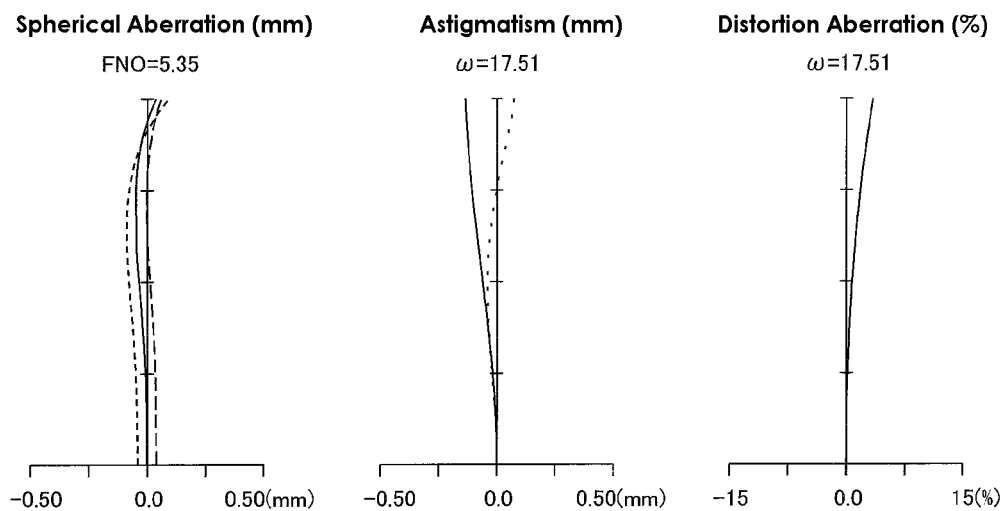
FIG. 3 is a longitudinal aberration diagram of a spherical aberration, astigmatism and distortion aberration in infinity focusing in an intermediate focal distance of a zoom lens according to Example 1 of the present invention.
Figure 4:
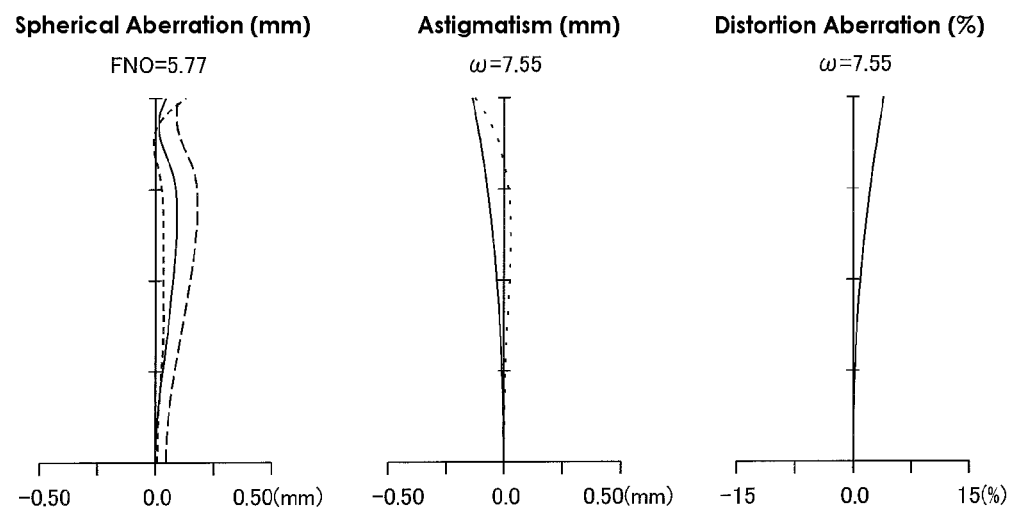
FIG. 4 is a longitudinal aberration diagram of a spherical aberration, astigmatism and distortion aberration in infinity focusing in a telephoto end of the zoom lens according to Example 1 of the present invention.

FIGS. 2 to 4 show longitudinal aberration diagrams of a spherical aberration, astigmatism and distortion abbreviation in infinity focusing at the wide angle end, intermediate focal distance and telephoto end of the zoom lens in Example 1. Each longitudinal aberration diagram shows a spherical aberration (SA (mm)), astigmatism (AST (mm)) and distortion aberration (DIS (%)) in order from the left side. In the spherical aberration diagrams, the perpendicular axis shows the F number (shown with F-NO. in the figure), the solid line shows the characteristic of the d line (d-line), the short broken line shows the characteristic of the F line (F-line) and the long broken line shows the characteristic of the C line (C-line). In the astigmatism diagrams, the perpendicular axis shows the angle of view (shown with W in the FIGs), the solid line shows the characteristic of a sagittal plane (shown with S in the FIGs) and the broken line shows the characteristic of the meridional plane (shown with M in the FIGs). In the distortion aberration diagrams, the perpendicular axis shows the angle of view (shown with W in the FIGs). Note that, these matters are common in FIGS. 7 to 9, 12 to 14 and 17 to 19.

Figure 5:
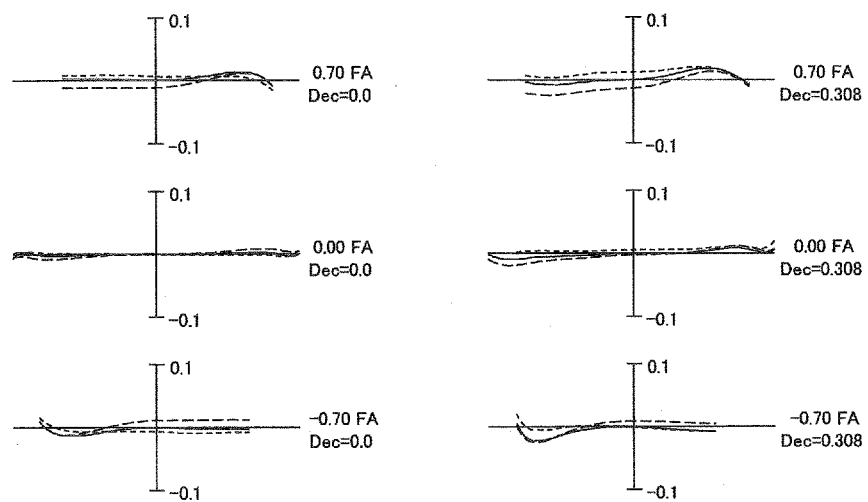
FIG. 5 is a lateral aberration diagram in a telephoto end of the zoom lens according to Example 1 of the present invention.

In addition, FIG. 5 is a lateral aberration diagram at the telephoto end of the zoom lens in Example 1. In each lateral aberration diagram shown in FIG. 5, three aberration diagrams positioned on the left side of the figure correspond to a basic state in which hand-shake compensation at the telephoto end is not performed. In addition, three aberration diagrams positioned on the right side of the figure correspond to a hand-shake compensation at the telephoto end in which the vibration-compensation lens group (hand-shake compensation optical system) is moved by a predetermined amount in the direction perpendicular to the optical axis. Note that, the matters are common in FIGS. 5, 10, 15 and 20.

In each lateral aberration diagram of the basic state, the top part corresponds to the lateral aberration at an image point of 70% of the maximum image height, the middle part corresponds to the lateral aberration at an image point on the axis, and the bottom part corresponds to the lateral aberration at an image point of −70% of the maximum image height. In each lateral aberration diagram of the hand-shake compensation, the top part corresponds to the lateral aberration at an image point of 70% of the maximum image height, the middle part corresponds to the lateral aberration at an image point on the axis, and the bottom part corresponds to the lateral aberration at an image point of −70% of the maximum image height. In addition, in each lateral aberration diagram, the horizontal axis shows the distance from the main light on the pupil surface, the solid line shows the d line (d-line), the short broken line shows the characteristic of the F line (F-line) and the long broken line shows the characteristic of the C line (C-line).

As is apparent in FIG. 5, the symmetric property of the lateral aberration in the image point on the axis is good. In contrast, if the lateral aberration at the image point of +70% and the lateral aberration at the image point of −70% are compared as the basic state, the eccentric coma aberration and the eccentric astigmatism are small since they have a small curve level and the inclines of the aberration curve lines are substantially equal. It means that sufficient imaging performance is acquired even in the hand-shake compensation. If the hand-shake compensation angle of the zoom lens system is identical, shorter the focal distance of the entire zoom lens system, less the amount of parallel translation required for the hand-shake compensation. Therefore, in any zoom position, sufficient hand-shake compensation without degrading the imaging characteristic can be achieved at a hand-shake compensation angle up to 0.3°. In addition, by applying the amount of parallel translation of the hand-shake compensation optical system at the telephoto end to the wide angle end and the intermediate focus position, the hand-shake compensation angle greater than 0.3° can be applied. These matters are common to Examples 2 to 9 described later.

Next, in Example 1, lens data of numerical values in Example 1 to which specific numerical values are applied is shown in Table 1. The lens data shown in Table 1 is as follows. "Surface No." denotes the lens surface number and denotes the lens surface order counted from the object side. In addition, "r" denotes the curvature radius of the lens surface, "d" denotes the thickness of the lens or the gap between mutually adjacent lens surfaces on the optical axis, "Nd" denotes the refractive index against the d line (wavelength λ=587.6 nm) and "vd" denotes the Abbe number against the d line (wavelength λ=587.6 nm). In addition, if the lens surface is an aspheric surface, "* (asterisk)" is attached after the surface number, and the paraxial curvature radius is shown in the column of curvature radius "r."

In addition, in the zoom lens system in Example 1, the F number (F-No.), the focal distance (f) of the entire system and the half angle of view (W (deg.)) at the wide angle end, the intermediate focal distance and the telephoto end are as follows. Note that, in the following expressions, the numerical values at the wide angle end, the intermediate focal distance and the telephoto end are shown with hyphen (-) in order from the right side.

$F$-No.=4.08-5.35-5.77

$f$=18.38-43.53-102.92

$W$=39.04-17.51-7.5

TABLE 1

| Face No. | r | d | Nd | vd |
|---|---|---|---|---|
| 1 | 73.624 | 1.500 | 1.9229 | 20.88 |
| 2 | 47.533 | 4.392 | 1.6968 | 55.46 |
| 3 | 762.099 | 0.200 | | |
| 4 | 39.569 | 3.581 | 1.4970 | 81.61 |

TABLE 1-continued

| Face No. | r | d | Nd | vd | |
|---|---|---|---|---|---|
| 5 | 189.703 | d5 | | | |
| 6* | 75.508 | 0.200 | 1.5146 | 49.96 | |
| 7 | 75.209 | 0.700 | 1.8830 | 40.81 | |
| 8 | 12.22 | 4.142 | | | |
| 9 | −31.855 | 0.700 | 1.8348 | 42.72 | |
| 10 | 23.848 | 0.200 | | | |
| 11 | 18.883 | 3.929 | 1.8467 | 23.78 | |
| 12 | −25.087 | 1.112 | | | |
| 13 | −16.264 | 0.700 | 1.8830 | 40.81 | |
| 14 | −52.982 | d14 | | | |
| 15 | INF | 1.000 | | | Aperture Diaphram |
| 16 | 12.902 | 5.706 | 1.4875 | 70.44 | |
| 17 | −13.048 | 0.700 | 1.9108 | 35.25 | |
| 18 | 254.391 | 0.500 | | | |
| 19* | 31.252 | 2.135 | 1.5533 | 71.68 | |
| 20* | −63.334 | 0.815 | | | |
| 21* | 42.506 | 4.737 | 1.5920 | 67.02 | |
| 22* | −15.482 | d22 | | | |
| 23 | 54.729 | 2.173 | 1.8061 | 33.27 | |
| 24 | −29.764 | 0.700 | 1.6968 | 55.46 | |
| 25 | 14.91 | d25 | | | |
| 26 | −13.675 | 0.700 | 1.9108 | 35.25 | |
| 27 | −26.3 | 0.358 | | | |
| 28 | 45.202 | 1.950 | 1.4875 | 70.44 | |
| 29 | INF | d29 | | | |
| 30 | INF | 2.000 | 1.5168 | 64.2 | |
| 31 | INF | 1.000 | | | |

*denotes aspheric surface

In addition, regarding the aspheric surface shown in Table 1, an aspheric surface coefficient if the shape is defined by the following expression z is shown in Table 2. In Table 2, "E-a" denotes "×10$^{-a}$".

$$z = ch^2/[1+\{1-(1+k)c^2h^2\}^{1/2}]+A4h^4+A6h^6+A8h^8+A10h^{10} \ldots$$

Note that, in the above expression, "c" denotes the curvature (1/r), "h" denotes the height from the optical axis, "k" denotes the conical coefficient, and each of "A4," "A6," "A8" and "A10," and so on, denotes the aspheric coefficient of each degree.

TABLE 2

| Face No. | k | A4 | A6 | A8 | A10 |
|---|---|---|---|---|---|
| 6 | 0.0000E+00 | −9.9255E−06 | −5.5707E−08 | 1.1972E−09 | −4.1409E−12 |
| 19 | 0.0000E+00 | −7.1459E−06 | −4.0032E−07 | 2.1295E−08 | −1.6610E−10 |
| 20 | 0.0000E+00 | 3.1391E−05 | −8.3685E−07 | 3.2005E−08 | −2.5109E−10 |
| 21 | 0.0000E+00 | −9.4262E−05 | −9.4180E−08 | 5.8470E−10 | 1.5646E−10 |
| 22 | 0.0000E+00 | 4.0097E−05 | 3.7533E−07 | −1.1299E−08 | 2.5018E−10 |

Table 3 shows the surface intervals in close object focusing in the wide angle end state, the intermediate focal distance state and the telephoto end state of numerical value example 1, together with focal distance (f) in infinite object focusing.

TABLE 3

| f | 18.38 | 43.53 | 102.92 |
|---|---|---|---|
| d5 | 1.000 | 13.345 | 26.894 |
| d14 | 14.933 | 5.901 | 1.500 |
| d22 | 2.762 | 3.967 | 1.995 |
| d25 | 7.959 | 6.754 | 8.726 |
| d29 | 12.514 | 22.932 | 33.258 |

EXAMPLE 2

Figure 6:
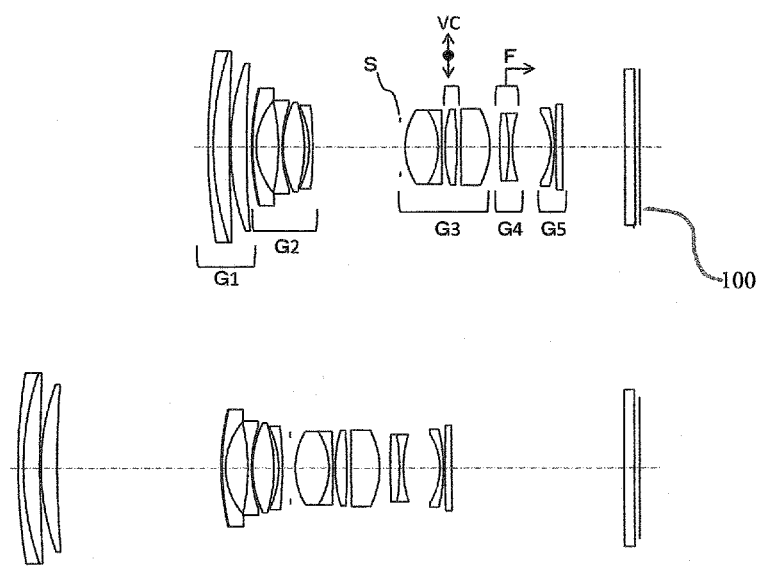
FIG. 6 is a schematic diagram exemplifying a structure of a zoom lens according to Example 2 of the present invention, where the upper diagram shows a lens arrangement at the wide angle end and the lower diagram shows a lens arrangement at the telephoto end

Next, the optical system of a zoom lens in Example 2 will be described with reference to the drawings. FIG. 6 is a schematic diagram exemplifying a structure of the zoom lens in Example 2. The zoom lens in Example 2 has substantially the same arrangement as the zoom lens in Example 1 and includes first lens group G1 having positive refracting power, second lens group G2 having negative refracting power, third lens group G3 having positive refracting power, fourth lens group G4 having negative refracting power and fifth lens group G5 having negative refracting power, where diaphragm S is disposed between the second lens group G2 and the third lens group G3. In addition, the third lens group G3 includes vibration-compensation lens group VC composed of a single positive lens, fourth lens group G4 is composed of a cemented lens in which a positive lens and a negative meniscus lens having a concave surface at the image focusing side are cemented, and fourth lens group G4 functions as focusing lens group F. Furthermore, at the object side of the fifth lens group G5, a meniscus lens having a concave surface at the object side is disposed. Note that, the specific lens arrangement of each lens group is as shown in FIG. 6. In addition, in magnification change from the wide angle end to the telephoto end, the lens groups move such that the gap between first lens group G1 and second lens group G2 increases and the gap between second lens group G2 and third lens group G3 decreases. In addition, third lens group G3 and the fifth lens group G5 move on the same trajectory in the magnification change. In addition, in focusing from the infinity to the close object, fourth lens group G4 moves toward the image focusing side. In addition, the movement in the direction perpendicular to the optical axis of vibration-compensation lens group VC in the hand-shake compensation at the telephoto end is 0.297 mm.

Figure 7:
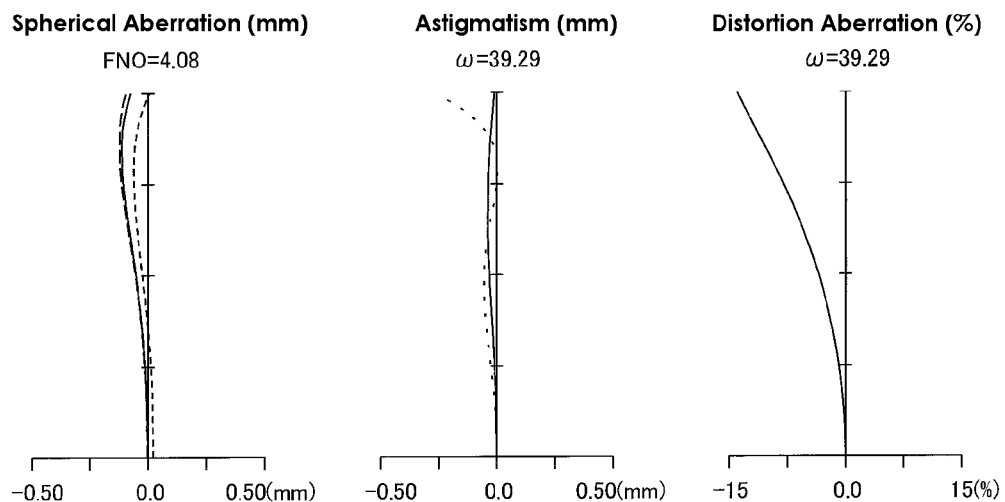
FIG. 7 is a longitudinal aberration diagram of a spherical aberration, astigmatism and distortion abbreviation in infinity focusing in a wide angle end of the zoom lens according to Example 2 of the present invention.
Figure 8:
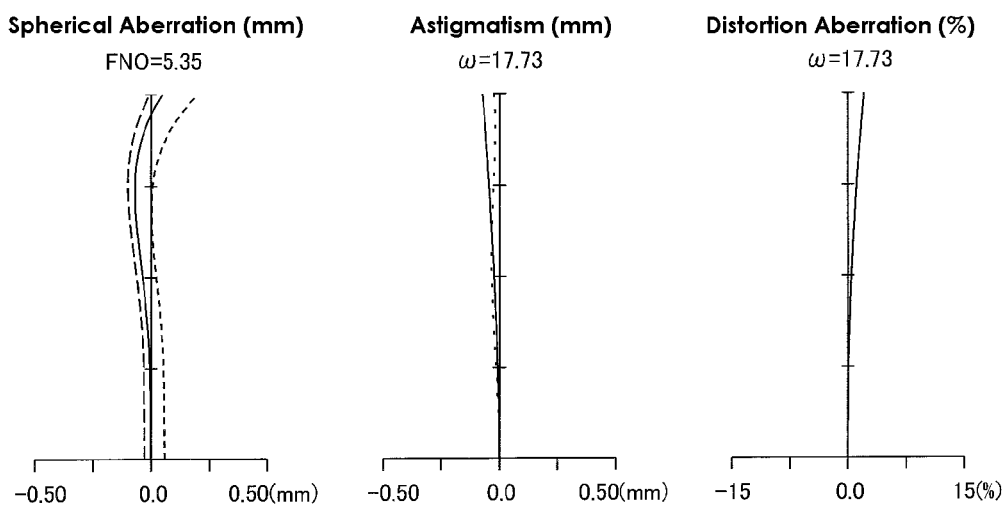
FIG. 8 is a longitudinal aberration diagram of a spherical aberration, astigmatism and distortion aberration in infinity focusing in an intermediate focal distance of the zoom lens according to Example 2 of the present invention.
Figure 9:
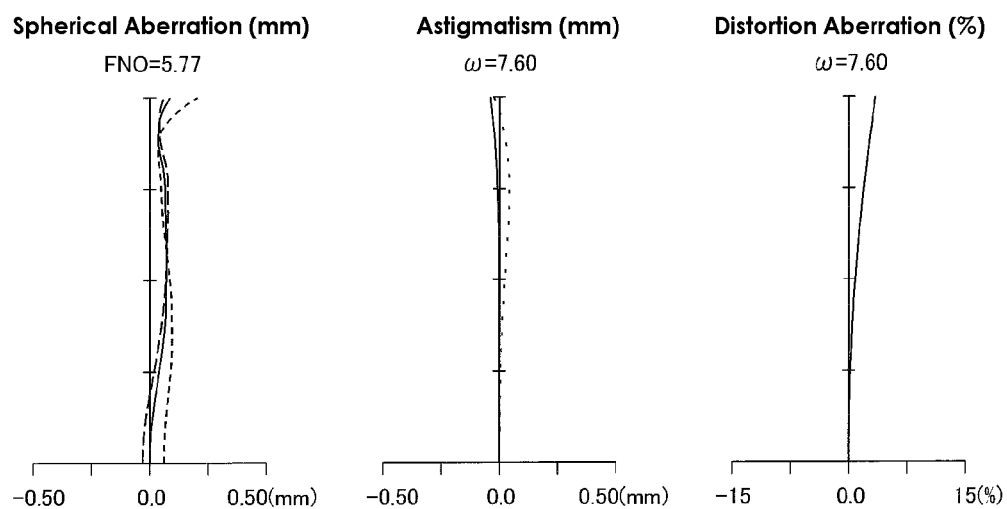
FIG. 9 is a longitudinal aberration diagram of a spherical aberration, astigmatism and distortion aberration in infinity focusing in a telephoto end of the zoom lens according to Example 2 of the present invention.
Figure 10:
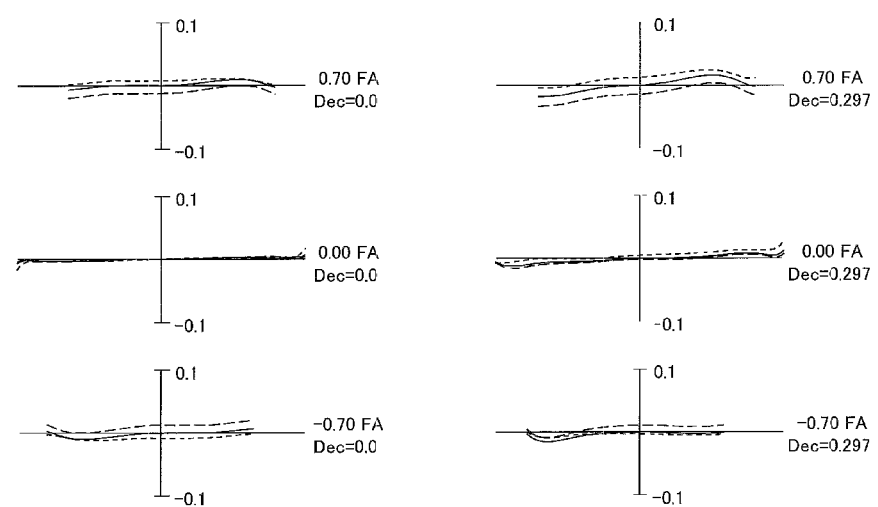
FIG. 10 is a lateral aberration diagram in a telephoto end of the zoom lens according to Example 2 of the present invention.
Figure 20:
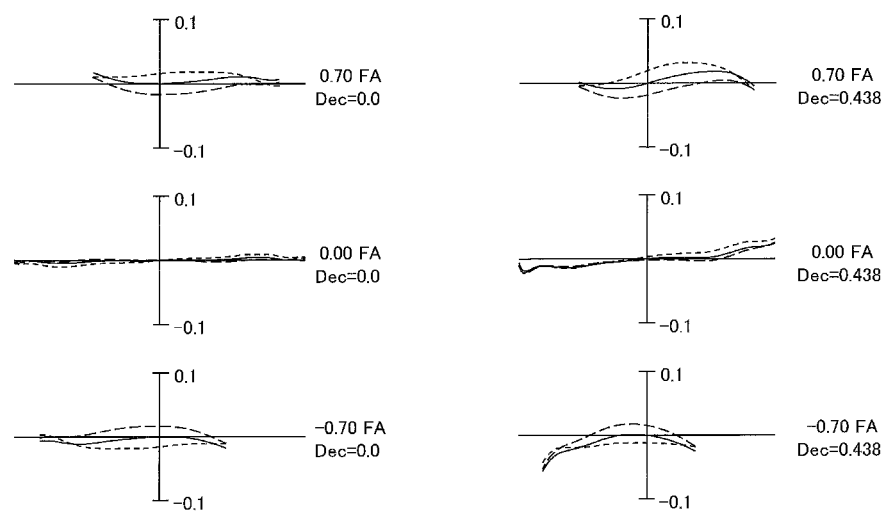
FIG. 20 is a lateral aberration diagram in a telephoto end of the zoom lens according to Example 4 of the present invention.

FIGS. 7 to 9 show longitudinal aberration diagrams of a spherical aberration, astigmatism and distortion abbreviation in infinity focusing at the wide angle end, intermediate focal distance and telephoto end of the zoom lens in Example 2. FIG. 20 is a lateral aberration diagram at the telephoto end. Tables 4 to 6 show lens data of numerical values in example 2 to which specific numerical values are applied, and are similar to the numerical value data shown in Tables 1 to 3, and therefore explanation related to each table is omitted.

In addition, in the zoom lens system in Example 2, the F number (F-No.), the focal distance (f) of the entire system and the half angle of view (W (deg.)) at the wide angle end, the intermediate focal distance and the telephoto end are as follows. Note that, in the following expressions, the numerical values at the wide angle end, the intermediate focal distance and the telephoto end are shown with hyphen (-) in order from the right side.

F-No.=4.08-5.35-5.77 f=18.37-43.54-102.85

W=39.29-17.73-7.60

TABLE 4

| Face No. | r | d | Nd | vd | |
|---|---|---|---|---|---|
| 1 | 117.627 | 1.000 | 1.9229 | 20.88 | |
| 2 | 58.712 | 3.142 | 1.6968 | 55.46 | |
| 3 | 313.996 | 0.200 | | | |
| 4 | 46.877 | 3.112 | 1.7433 | 49.22 | |
| 5 | 199.423 | d5 | | | |
| 6* | 42.203 | 0.200 | 1.5146 | 49.96 | |
| 7 | 47.968 | 0.700 | 1.9108 | 35.25 | |
| 8 | 13.443 | 4.328 | | | |
| 9 | −38.568 | 0.700 | 1.9108 | 35.25 | |
| 10 | 24.347 | 0.200 | | | |
| 11 | 19.803 | 4.134 | 1.9229 | 20.88 | |
| 12 | −29.52 | 0.952 | | | |
| 13 | −18.035 | 0.699 | 1.9108 | 35.25 | |
| 14 | −74.883 | d14 | | | |
| 15 | INF | 1.000 | | | Aperture Diaphram |
| 16 | 13.269 | 6.558 | 1.4970 | 81.61 | |
| 17 | −13.088 | 0.700 | 1.9108 | 35.25 | |
| 18 | −510.94 | 0.500 | | | |
| 19* | 25.182 | 2.270 | 1.4971 | 81.56 | |
| 20* | −74.197 | 0.819 | | | |
| 21* | 88.167 | 5.523 | 1.6226 | 58.16 | |
| 22* | −15.692 | d22 | | | |
| 23 | 98.558 | 1.813 | 1.9537 | 32.32 | |
| 24 | −39.364 | 0.700 | 1.6968 | 55.46 | |
| 25 | 21.526 | d25 | | | |
| 26 | −12.098 | 0.700 | 1.8810 | 40.14 | |
| 27 | −30.336 | 0.197 | | | |
| 28 | 197.89 | 1.329 | 1.6180 | 63.4 | |
| 29 | INF | d29 | | | |
| 30 | INF | 2.000 | 1.5168 | 64.2 | |
| 31 | INF | 1.000 | | | |

*denotes aspheric surface

TABLE 5

| Face No. | k | A4 | A6 | A8 | A10 |
|---|---|---|---|---|---|
| 6 | 0.0000E+00 | −1.4602E−05 | 4.6684E−09 | −2.5158E−10 | 4.1103E−12 |
| 19 | 0.0000E+00 | −9.4353E−06 | −4.3725E−07 | 1.9649E−08 | −1.5835E−10 |
| 20 | 0.0000E+00 | 3.5643E−05 | −8.9345E−07 | 3.0472E−08 | −2.4468E−10 |
| 21 | 0.0000E+00 | −9.3916E−05 | −1.6034E−07 | −3.5640E−09 | 1.2227E−10 |
| 22 | 0.0000E+00 | 2.1261E−05 | 2.7680E−07 | −1.0559E−08 | 1.6059E−10 |

TABLE 6

| f | 18.37 | 43.54 | 102.85 |
|---|---|---|---|
| d5 | 0.995 | 14.956 | 31.514 |
| d14 | 16.800 | 6.661 | 1.500 |
| d22 | 1.996 | 3.728 | 1.993 |
| d25 | 7.189 | 5.457 | 7.193 |
| d29 | 12.148 | 22.737 | 33.319 |

EXAMPLE 3

Figure 11:
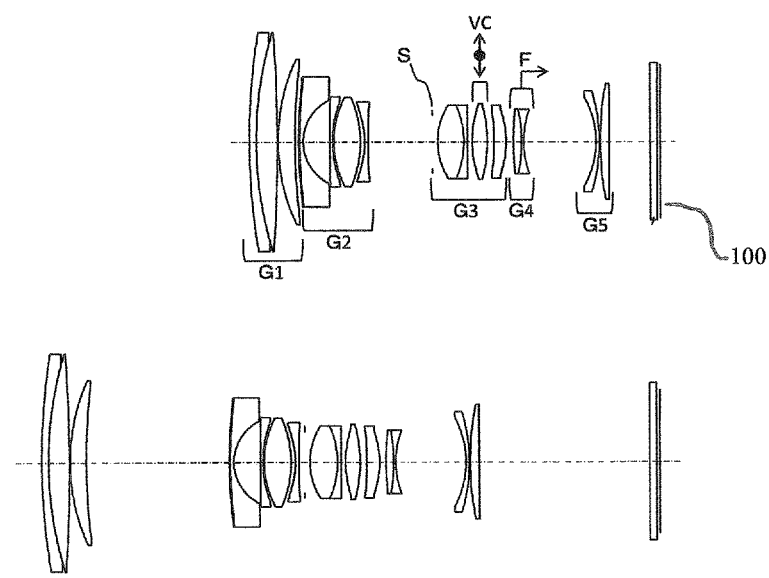
FIG. 11 is a schematic diagram exemplifying a structure of a zoom lens according to Example 3 of the present invention, where the upper diagram shows a lens arrangement at the wide angle end and the lower diagram shows a lens arrangement at the telephoto end
Figure 12:
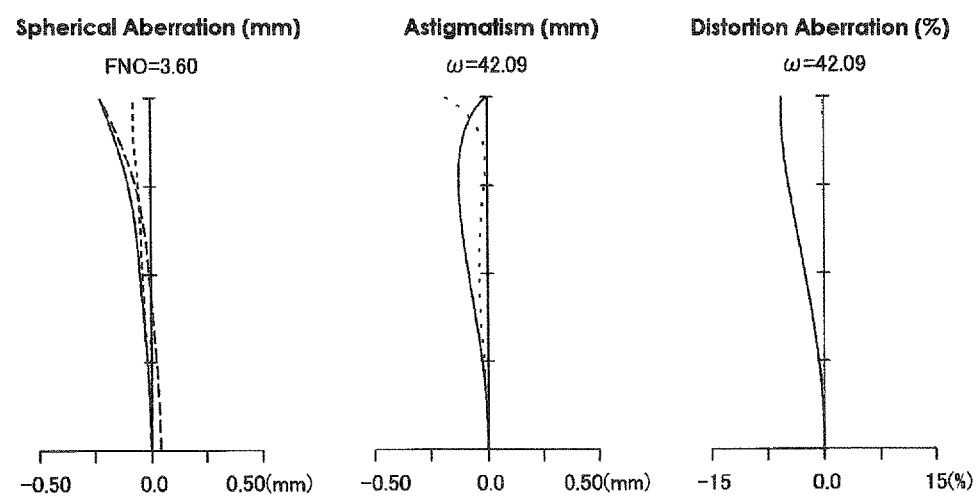
FIG. 12 is a longitudinal aberration diagram of a spherical aberration, astigmatism and distortion abbreviation in infinity focusing in a wide angle end of the zoom lens according to Example 3 of the present invention.
Figure 13:
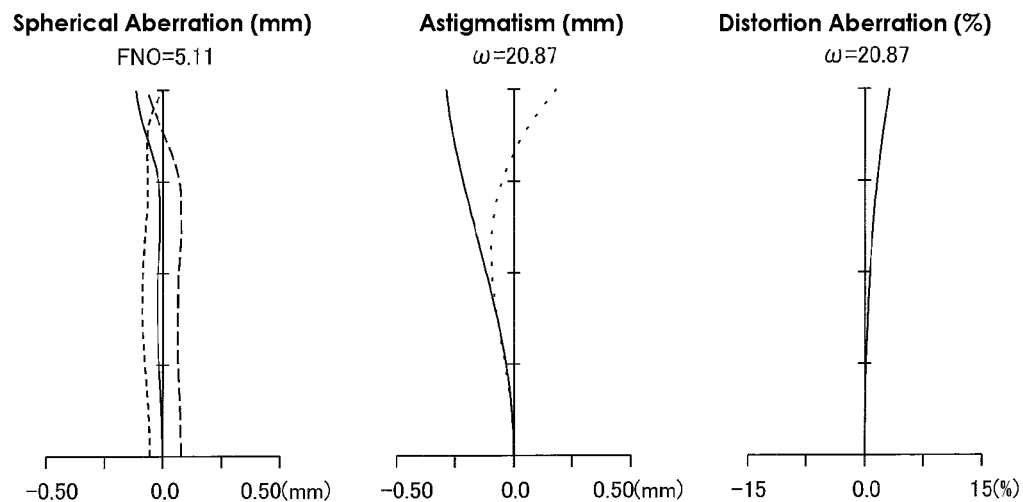
FIG. 13 is a longitudinal aberration diagram of a spherical aberration, astigmatism and distortion aberration in infinity focusing in an intermediate focal distance of the zoom lens according to Example 3 of the present invention.
Figure 14:
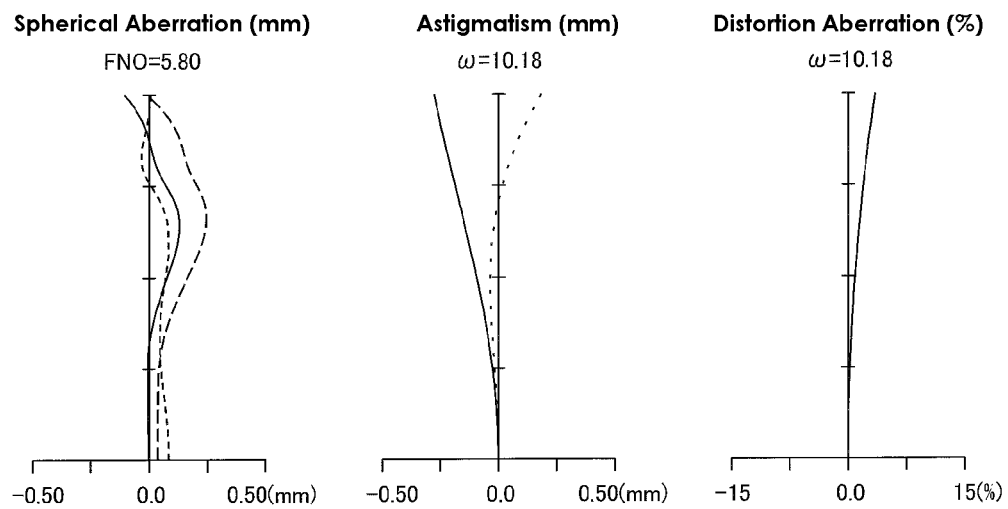
FIG. 14 is a longitudinal aberration diagram of a spherical aberration, astigmatism and distortion aberration in infinity focusing in a telephoto end of the zoom lens according to Example 3 of the present invention.
Figure 15:
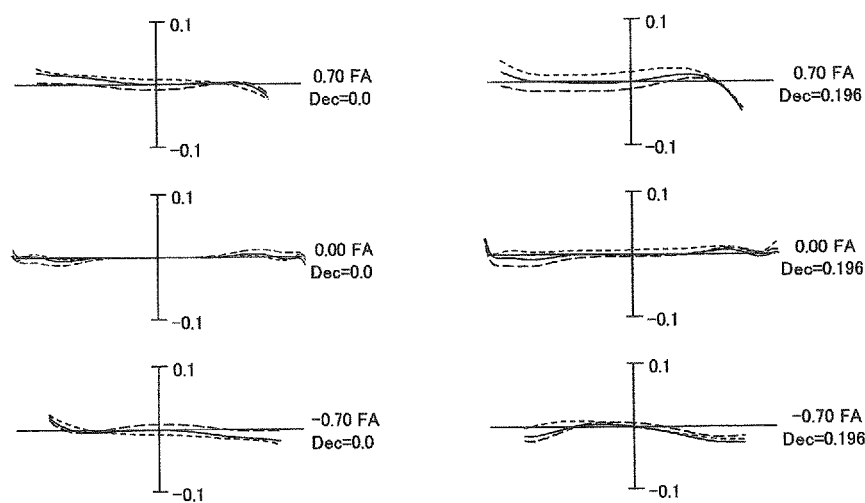
FIG. 15 is a lateral aberration diagram in a telephoto end of the zoom lens according to Example 3 of the present invention.

Next, the optical system of a zoom lens in Example 3 will be described with reference to the drawings. FIG. 11 is a schematic diagram exemplifying a structure of the zoom lens in Example 3. The zoom lens in Example 3 has substantially the same arrangement as the zoom lens in Example 1 and includes first lens group G1 having positive refracting power, second lens group G2 having negative refracting power, third lens group G3 having positive refracting power, fourth lens group G4 having negative refracting power and fifth lens group G5 having negative refracting power, where diaphragm S is disposed between the second lens group G2 and the third lens group G3. In addition, the third lens group G3 includes vibration-compensation lens group VC composed of a single positive lens, fourth lens group G4 is composed of a cemented lens in which a positive lens and a negative meniscus lens having a concave surface at the image focusing side are cemented, and fourth lens group G4 functions as focusing lens group F. Furthermore, at the object side of the fifth lens group G5, a meniscus lens having a concave surface at the object side is disposed. Note that, the specific lens arrangement of each lens group is as shown in FIG. 11. In addition, in magnification change from the wide angle end to the telephoto end, the lens groups move such that the gap between first lens group G1 and second lens group G2 increases and the gap between second lens group G2 and third lens group G3 decreases. Further, third lens group G3 and the fifth lens group move along the same trace in the magnification change. Moreover, in focusing from the infinity to the close object, fourth lens group G4 moves toward the image focusing side. In addition, the movement in the direction vertical to the optical axis of vibration-compensation lens group VC in the hand-shake compensation at the telephoto end is 0.196 mm.

FIGS. 11 to 14 show longitudinal aberration diagrams of a spherical aberration, astigmatism and distortion abbreviation in infinity focusing at the wide angle end, intermediate focal distance and telephoto end of the zoom lens in Example 3. FIG. 20 is a lateral aberration diagram at the telephoto end. Tables 7 to 9 show lens data of numerical values in example 3 to which specific numerical values are applied, and are similar to the numerical value data shown in Tables 1 to 3, and therefore explanation related to each table is omitted.

In addition, in the zoom lens system in Example 3, the F number (F-No.), the focal distance (f) of the entire system and the half angle of view (W (deg.)) at the wide angle end, the intermediate focal distance and the telephoto end are as follows. Note that, in the following expressions, the numerical values at the wide angle end, the intermediate focal distance and the telephoto end are shown with hyphen (-) in order from the right side.

F-No.=3.60-5.11-5.80 f=24.75-54.97-116.31

W=42.09-20.87-10.18

TABLE 7

| Face No. | r | d | Nd | vd |
|---|---|---|---|---|
| 1 | 193.949 | 2.000 | 1.9229 | 20.88 |
| 2 | 107.656 | 6.185 | 1.5688 | 56.04 |
| 3 | −440.2 | 0.200 | | |
| 4 | 56.866 | 4.853 | 1.4970 | 81.61 |

TABLE 7-continued

| Face No. | r | d | Nd | vd |
|---|---|---|---|---|
| 5 | 189.595 | d5 | | |
| 6* | 135.25 | 0.300 | 1.5146 | 49.96 |
| 7 | 162.567 | 1.000 | 1.7015 | 41.15 |
| 8 | 13.353 | 7.753 | | |
| 9 | 585.833 | 0.800 | 2.0010 | 29.13 |
| 10 | 33.15 | 0.300 | | |
| 11 | 27.443 | 7.817 | 1.8467 | 23.78 |
| 12 | −32.407 | 1.253 | | |
| 13* | −23.989 | 1.000 | 1.7725 | 49.47 |
| 14* | 532.737 | d14 | | |
| 15 | INF | 1.500 | | Aperture Diaphram |
| 16 | 19.377 | 8.000 | 1.5168 | 64.2 |
| 17 | −24.881 | 1.000 | 2.0010 | 29.13 |
| 18 | INF | 1.341 | | |
| 19* | 27.508 | 4.274 | 1.4971 | 81.56 |
| 20* | −43.427 | 2.000 | | |
| 21* | −129.13 | 3.531 | 1.6226 | 58.16 |
| 22* | −26.674 | d22 | | |
| 23 | 100.167 | 2.307 | 1.8061 | 33.27 |
| 24 | −47.435 | 0.600 | 1.6968 | 55.46 |
| 25 | 25.245 | d25 | | |
| 26 | −25.982 | 1.000 | 2.0010 | 29.13 |
| 27 | −48.742 | 0.200 | | |
| 28 | 86.614 | 2.553 | 1.4875 | 70.44 |
| 29 | INF | d29 | | |
| 30 | INF | 2.000 | 1.5168 | 64.2 |
| 31 | INF | 1.000 | | |

*denotes aspheric surface

TABLE 8

| Face No. | k | A4 | A6 | A8 | A10 |
|---|---|---|---|---|---|
| 6 | 0.0000E+00 | 3.2247E−06 | −2.1147E−08 | 1.1952E−11 | 1.6518E−14 |
| 13 | 0.0000E+00 | 2.1973E−05 | 1.4771E−07 | −7.7234E−10 | 5.3562E−12 |
| 14 | 0.0000E+00 | 5.6578E−06 | 1.0991E−07 | −8.5808E−10 | 5.7825E−12 |
| 19 | 0.0000E+00 | −2.0719E−05 | −1.1320E−07 | 9.7803E−10 | −4.7819E−12 |
| 20 | 0.0000E+00 | 4.1454E−06 | −1.4106E−07 | 1.2865E−09 | −5.8775E−12 |
| 21 | 0.0000E+00 | −4.1702E−05 | 9.8845E−08 | 1.1763E−09 | 1.5485E−12 |
| 22 | 0.0000E+00 | −8.9068E−07 | 1.5348E−07 | 1.8485E−10 | 6.7653E−12 |

TABLE 9

| f | 24.75 | 54.97 | 116.31 |
|---|---|---|---|
| d5 | 1.041 | 16.211 | 41.385 |
| d14 | 18.776 | 6.017 | 1.632 |
| d22 | 2.078 | 3.946 | 2.003 |
| d25 | 20.800 | 18.932 | 20.875 |
| d29 | 12.100 | 30.290 | 49.336 |

EXAMPLE 4

Figure 16:
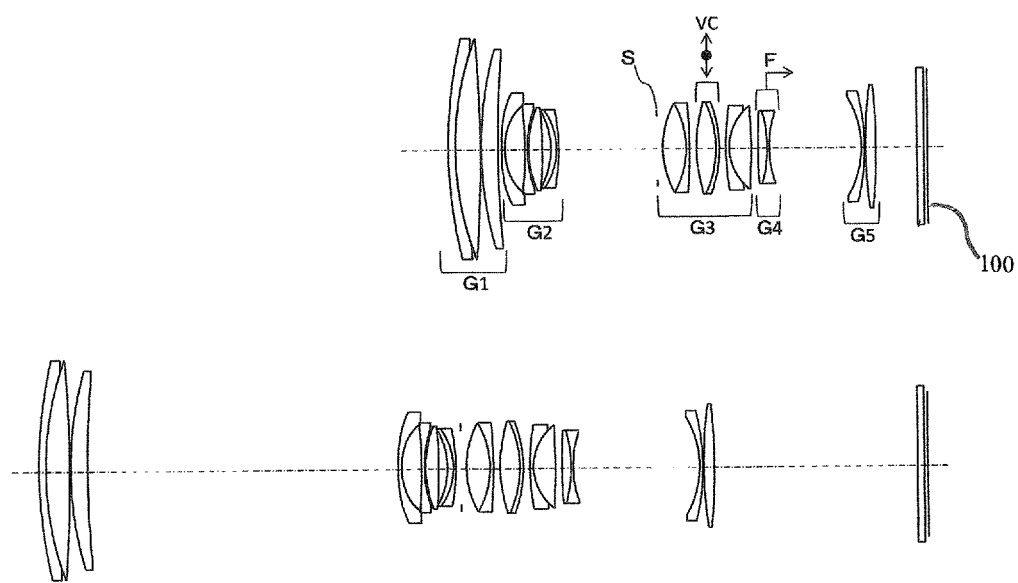
FIG. 16 is a schematic diagram exemplifying a structure of a zoom lens according to Example 4 of the present invention, where the upper diagram shows a lens arrangement at the wide angle end and the lower diagram shows a lens arrangement at the telephoto end

Next, the optical system of a zoom lens in Example 4 will be described with reference to the drawings. FIG. 16 is a schematic diagram exemplifying a structure of the zoom lens in Example 4. The zoom lens in Example 4 has substantially the same arrangement as the zoom lens in Example 1 and includes first lens group G1 having positive refracting power, second lens group G2 having negative refracting power, third lens group G3 having positive refracting power, fourth lens group G4 having negative refracting power and fifth lens group G5 having negative refracting power, where diaphragm S is disposed between the second lens group G2 and the third lens group G3. In addition, the third lens group G3 has vibration-compensation lens group VC composed of a biconvex positive lens, fourth lens group G4 is composed of a cemented lens in which a positive lens and a negative meniscus lens having a concave surface at the image focusing side are cemented, and fourth lens group G4 functions as focusing lens group F. Furthermore, at the object side of the fifth lens group G5, a meniscus lens having a concave surface at the object side is disposed. Note that, the specific lens arrangement of each lens group is as shown in FIG. 16. In addition, in magnification change from the wide angle end to the telephoto end, the lens groups move such that the gap between first lens group G1 and second lens group G2 increases and the gap between second lens group G2 and third lens group G3 decreases. In addition, in the magnification change, third lens group G3 and the fifth lens group G5 move on the same trajectory. In addition, in focusing from the infinity to the close object, fourth lens group G4 moves toward the image focusing side. In addition, the movement in the direction perpendicular to the optical axis of vibration-compensation lens group VC in the hand-shake compensation at the telephoto end is 0.438 mm.

Figure 17:
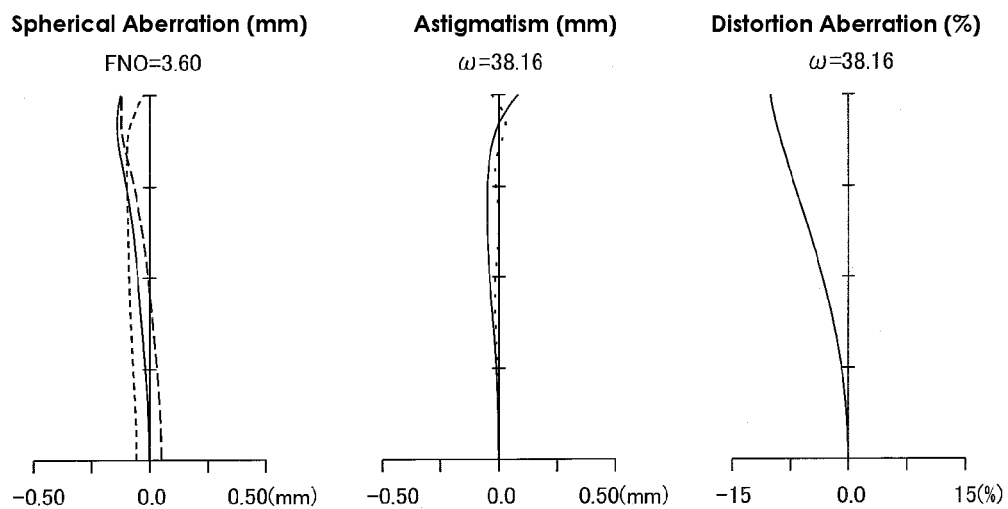
FIG. 17 is a longitudinal aberration diagram of a spherical aberration, astigmatism and distortion abbreviation in infinity focusing in a wide angle end of the zoom lens according to Example 4 of the present invention.
Figure 18:
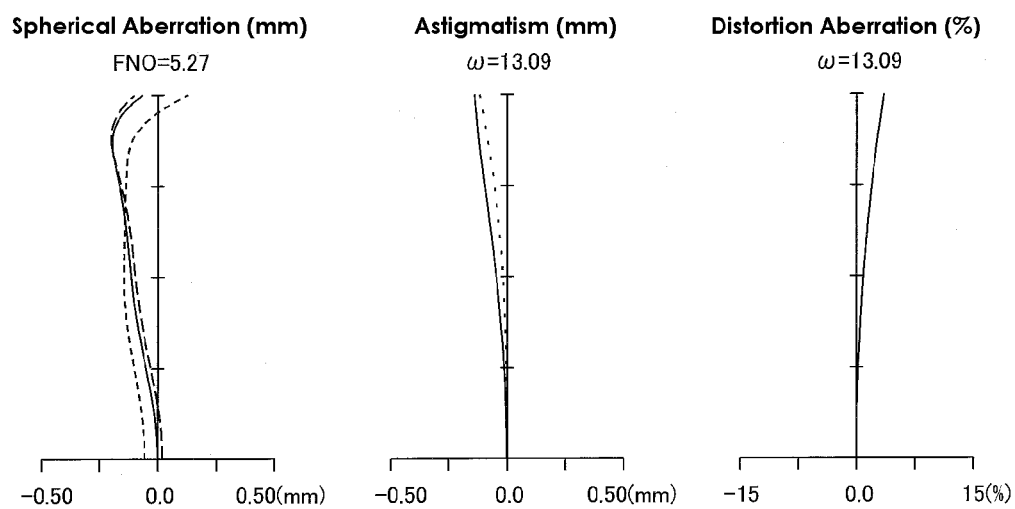
FIG. 18 is a longitudinal aberration diagram of a spherical aberration, astigmatism and distortion aberration in infinity focusing in an intermediate focal distance of the zoom lens according to Example 4 of the present invention.
Figure 19:
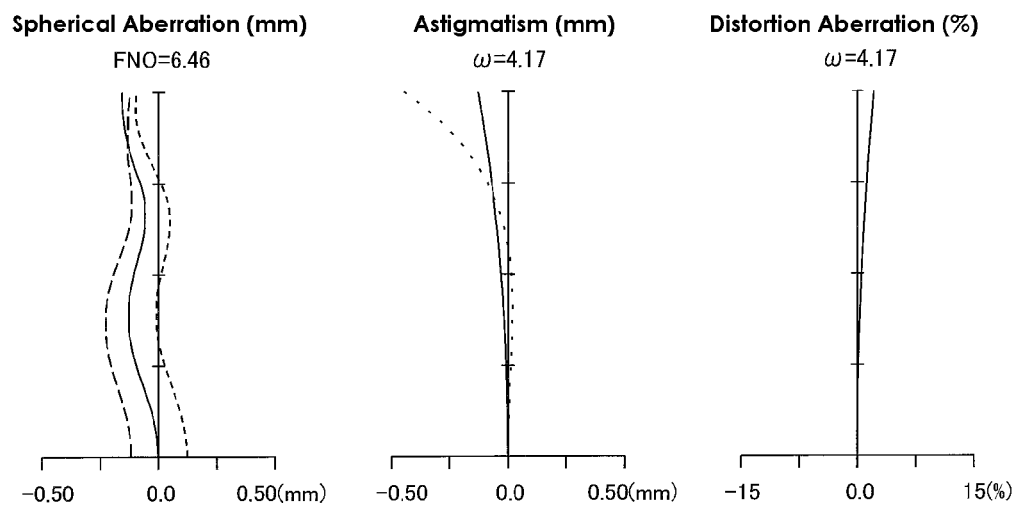
FIG. 19 is a longitudinal aberration diagram of a spherical aberration, astigmatism and distortion aberration in infinity focusing in a telephoto end of the zoom lens according to Example 4 of the present invention.

FIGS. 17 to 19 show longitudinal aberration diagrams of a spherical aberration, astigmatism and distortion abbreviation in infinity focusing at the wide angle end, intermediate focal distance and telephoto end of the zoom lens in Example 4. FIG. 20 is a lateral aberration diagram at the telephoto end. Tables 10 to 12 show lens data of numerical values in example 4 to which specific numerical values are applied, and are similar to the numerical value data shown in Tables 1 to 3, and therefore explanation related to each table is omitted.

In addition, in the zoom lens system in Example 4, the F number (F-No.), the focal distance (f) of the entire system and the half angle of view (W (deg.)) at the wide angle end, the intermediate focal distance and the telephoto end are as follows. Note that, in the following expressions, the numerical values at the wide angle end, the intermediate focal distance and the telephoto end are shown with hyphen (-) in order from the right side.

$F$-No.=3.60-5.27-6.46

$f$=28.88-90.03-290.84

$W$=38.16-13.09-4.17

TABLE 10

| Face No. | r | d | Nd | vd |
|---|---|---|---|---|
| 1 | 137.911 | 2.000 | 1.9037 | 31.31 |
| 2 | 92.09 | 7.189 | 1.4970 | 81.61 |
| 3 | −384.7 | 0.200 | | |
| 4 | 104.384 | 4.918 | 1.4370 | 95.1 |
| 5 | 317.161 | d5 | | |
| 6* | 79.259 | 1.000 | 1.7725 | 49.47 |
| 7* | 21.8 | 5.826 | | |
| 8 | −137.33 | 0.800 | 1.7725 | 49.62 |
| 9 | 35.147 | 0.300 | | |

TABLE 10-continued

| Face No. | r | d | Nd | vd | |
|---|---|---|---|---|---|
| 10* | 29.572 | 3.921 | 1.8211 | 24.06 | |
| 11* | −391.74 | 2.577 | | | |
| 12 | −22.537 | 1.699 | 1.8061 | 33.27 | |
| 13 | −19.595 | 0.700 | 1.7725 | 49.62 | |
| 14 | −56.14 | d14 | | | |
| 15 | INF | 1.500 | | | Aperture Diaphram |
| 16 | 27.787 | 6.785 | 1.5673 | 42.84 | |
| 17 | −26.054 | 1.000 | 1.9037 | 31.31 | |
| 18 | −157.64 | 2.000 | | | |
| 19* | 37.96 | 5.736 | 1.4971 | 81.56 | |
| 20 | −31.301 | 1.000 | 1.9229 | 20.88 | |
| 21 | −37.63 | 2.000 | | | |
| 22 | 74.927 | 1.000 | 1.6584 | 50.85 | |
| 23 | 15.44 | 6.410 | 1.5533 | 71.68 | |
| 24* | −105.33 | d24 | | | |
| 25 | 152.784 | 2.714 | 1.8467 | 23.78 | |
| 26 | −39.519 | 0.600 | 1.7495 | 35.04 | |
| 27 | 31.284 | d27 | | | |
| 28 | −28.376 | 1.000 | 1.9037 | 31.31 | |
| 29 | −64.047 | 0.200 | | | |
| 30 | 121.84 | 3.156 | 1.8467 | 23.78 | |
| 31 | −176.07 | d31 | | | |
| 32 | INF | 2.000 | 1.5168 | 64.2 | |
| 33 | INF | 1.000 | | | |

*denotes aspheric surface

TABLE 11

| Face No. | k | A4 | A6 | A8 | A10 | A12 |
|---|---|---|---|---|---|---|
| 6 | 8.4076E+00 | 1.7250E−05 | 4.3452E−08 | −1.4222E−10 | −6.5049E−13 | 2.1130E−15 |
| 7 | 5.5997E−01 | 1.0490E−05 | 1.0659E−07 | 3.8357E−10 | 7.8231E−13 | −3.8906E−15 |
| 10 | −1.2378E+00 | −1.2308E−05 | −9.3912E−09 | 1.0081E−09 | 1.3103E−12 | −2.8781E−14 |
| 11 | 5.2958E+00 | −1.6399E−05 | −4.8014E−08 | 6.4311E−10 | 1.6519E−12 | −2.5999E−14 |
| 19 | 2.4091E−01 | −1.3287E−05 | −5.8038E−09 | 1.2122E−10 | −8.0358E−13 | 1.6692E−15 |
| 24 | −4.5723E+00 | 1.2527E−05 | 2.8115E−09 | −2.0636E−11 | 3.9484E−13 | −1.0798E−15 |

TABLE 12

| f | 28.88 | 90.03 | 290.84 |
|---|---|---|---|
| d5 | 1.000 | 38.036 | 90.871 |
| d14 | 28.943 | 6.151 | 1.500 |
| d24 | 1.989 | 12.893 | 1.987 |
| d27 | 26.738 | 23.633 | 36.915 |
| d31 | 12.101 | 27.493 | 59.499 |

Table 13 shows the numerical values corresponding to the expressions described in conditional expressions (1) to (6) of the Examples 1 to 4.

TABLE 13

| | Example 1 | Example 2 | Example 3 | Example 4 |
|---|---|---|---|---|
| Conditional Expression 1 | 1.771 | 2.483 | 1.654 | 1.373 |
| Conditional Expression 2 | 3.671 | 4.579 | 3.968 | 4.884 |
| Conditional Expression 3 | 1.378 | 1.653 | 2.092 | 1.751 |
| Conditional Expression 4 | 2.073 | 2.054 | 1.906 | 1.835 |
| Conditional Expression 5 | −0.493 | −0.339 | −0.633 | −1.009 |
| Conditional Expression 6 | 0.520 | 0.399 | 0.533 | 0.443 |
| β 5T | 1.771 | 2.483 | 1.654 | 1.373 |
| fw | 18.376 | 18.373 | 24.753 | 28.876 |
| ft | 102.918 | 102.850 | 116.313 | 290.841 |
| f1 | 59.929 | 71.844 | 112.233 | 160.506 |

TABLE 13-continued

| | Example 1 | Example 2 | Example 3 | Example 4 |
|---|---|---|---|---|
| β 4W | 1.524 | 1.248 | 1.569 | 1.643 |
| β 5W | 1.360 | 1.646 | 1.215 | 1.117 |
| ra3 | 31.252 | 25.182 | 27.508 | 37.960 |
| rb3 | −63.334 | −74.197 | −43.427 | −37.630 |
| ra4 | 54.729 | 98.558 | 100.167 | 152.784 |
| rb4 | 14.910 | 21.526 | 25.245 | 31.284 |
| ra5 | −13.675 | −12.098 | −25.982 | −28.376 |
| rb5 | −26.300 | −30.336 | −48.742 | −64.047 |

According to the present invention, it is possible to provide a zoom lens which is small as a whole and in which it is possible to keep a change in the imaging magnification due to wobbling small, especially perform weight saving of a lens system of the focus group, reduce the load of the focus drive system, miniaturize and lighten the vibration-proof lens system and reduce the load of the vibration-proof drive system.

SYMBOL LIST

G1 First lens group
G2 Second lens group
G3 Third lens group
G4 Fourth lens group
G5 Fifth lens group
F Focus group
VC Vibration-compensation lens group
S Aperture diaphragm

The invention claimed is:

1. A zoom lens including a first lens group having positive refractive power, a second lens group having negative refractive power, a third lens group having positive refractive power, a fourth lens group having negative refractive power and a fifth lens group having negative refractive power in order from an object side,
    wherein a surface of the fifth lens group disposed closest to the object side is concave;
    wherein the lens groups move in magnification change from a wide angle end to a telephoto end such that a gap between the first lens group and the second lens group increases and a gap between the second lens group and the third lens group decreases;
    a negative lens group disposed closer to an image plane side than a diaphragm among all lens groups is set as a focusing lens group, and the focusing lens group moves toward the image plane side in focusing from infinity to a close object;
    the zoom lens satisfies conditional expression (1) and conditional expression (3); and
    the focus lens group is composed of a single lens block of a meniscus shape provided with a concave surface at an image plane side; and satisfies conditional expression (2) below:

[Expression 1]

$$1.30 \leq \beta 5T \leq 2.80 \quad (1)$$

where

β5T: Lateral magnification in telephoto end of fifth lens group

[Expression 2]

$$3.10 \leq ra4/rb4 \leq 5.40 \quad (2)$$

where ra4: Curvature radius of object side surface of focus lens group rb4: Curvature radius of image plane side surface of focus lens group

[Expression 3]

$$1.10 \leq f1/(fw \times ft)^{1/2} \leq 3.00 \quad (3)$$

where f1: Focal length of first lens group fw: Focal length of the zoom lens at the wide angle end ft: Focal length of the zoom lens at the telephoto end.

2. The zoom lens according to claim 1, wherein the zoom lens satisfies conditional expression (4) below:

[Expression 4]

$$1.40 \leq \beta 4W \times \beta 5W \leq 2.50 \quad (4)$$

where

β4W: Lateral magnification in wide angle end of fourth lens group

β5W: Lateral magnification in wide angle end of fifth lens group.

3. The zoom lens according to claim 1, wherein the third lens group includes at least a vibration-compensation lens group composed of a single lens block; hand-shake compensation is performed by moving the vibration-compensation lens group in a direction perpendicular to an optical axis; and satisfies conditional expression (5) below:

[Expression 5]

$$-1.30 \leq ra3/rb3 \leq -0.10 \quad (5)$$

Where ra3: Curvature radius of object side surface of vibration-compensation lens group rb3: Curvature radius of image focusing side surface of vibration-compensation lens group.

4. The zoom lens according to claim 1, wherein the fifth lens group includes at least a single lens block of a meniscus shape provided with a concave surface at an object side; and the single lens block of the meniscus shape has a negative focal length and satisfies conditional expression (6) below:

[Expression 6]

$$0.15 \leq ra5/rb5 \leq 0.80 \quad (6)$$

where ra5: Curvature radius of object side surface of the single lens block of meniscus shape rb5: Curvature radius of image plane side surface of the single lens block of meniscus shape.

5. An imaging apparatus including a zoom lens according to claim 1, and an imaging sensor that converts an optical image formed on an image plane side by the zoom lens into an electrical signal.

* * * * *